US007620661B2

(12) United States Patent (10) Patent No.: US 7,620,661 B2
Mehaffy et al. (45) Date of Patent: Nov. 17, 2009

(54) METHOD FOR IMPROVING THE PERFORMANCE OF DATABASE LOGGERS USING AGENT COORDINATION

(75) Inventors: David William Mehaffy, Austin, TX (US); James William Van Fleet, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 11/260,623

(22) Filed: Oct. 27, 2005

(65) Prior Publication Data

US 2007/0100826 A1 May 3, 2007

(51) Int. Cl.
*G08F 12/00* (2006.01)
*G06F 17/30* (2006.01)
(52) U.S. Cl. .................................... 707/202; 707/200
(58) Field of Classification Search ................ 707/200, 707/201, 202
See application file for complete search history.

(56) References Cited

U.S. PATENT DOCUMENTS

| 5,495,601 | A | * | 2/1996 | Narang et al. .................. 707/8 |
|---|---|---|---|---|
| 5,636,376 | A | * | 6/1997 | Chang ......................... 717/127 |
| 5,737,600 | A | | 4/1998 | Geiner et al. |
| 5,787,439 | A | * | 7/1998 | Taysom .................. 707/103 R |
| 5,950,212 | A | * | 9/1999 | Anderson et al. ........... 707/205 |
| 6,167,424 | A | * | 12/2000 | Bak et al. .................... 718/100 |
| 6,173,442 | B1 | * | 1/2001 | Agesen et al. .............. 717/141 |
| 6,721,765 | B2 | * | 4/2004 | Ghosh et al. ................ 707/202 |
| 6,732,124 | B1 | * | 5/2004 | Koseki et al. ............... 707/202 |
| 6,745,175 | B2 | * | 6/2004 | Pierce et al. .................... 707/2 |
| 7,305,421 | B2 | * | 12/2007 | Cha et al. ..................... 707/202 |
| 7,366,742 | B1 | * | 4/2008 | Umbehocker et al. ....... 707/204 |
| 2002/0078119 | A1 | * | 6/2002 | Brenner et al. .............. 709/102 |
| 2003/0009477 | A1 | * | 1/2003 | Wilding et al. ........... 707/104.1 |
| 2004/0167894 | A1 | * | 8/2004 | Ziv ............................... 707/9 |
| 2005/0240899 | A1 | * | 10/2005 | Fleischmann et al. ....... 717/106 |

OTHER PUBLICATIONS

Chen, G. Kandemir, M. Irwin, M. Kang, B. Vijaykrishnan, N. Chandramouli, R. "Studying Energy Trade Offs in Offloading Computation/Compilation in Java-Enabled Mobile Devices," Sep. 2004, IEEE Transactions On Parallel and Distributed Systems, vol. 15, No. 9.*

"High-Performance Server Architecture" PI.atyp.us, Oct. 10, 2004, http://web.archive.org/web/20041010211601/http://pl.atyp.us/content/tech/servers.html.*

* cited by examiner

*Primary Examiner*—James Trujillo
*Assistant Examiner*—Marc Somers
(74) *Attorney, Agent, or Firm*—Dillon & Yudell LLP (57) ABSTRACT

A method for substantially reducing the latency of the database (DB) logging process by removing the agent notification requirement from the DB logger and allowing the DB logger to proceed to the next commit process without the latency of providing each waiting agent a notification that the agent continue their respective processes. When an agent commits a change to persistent storage of the database, the request is received by the logger, which performs the update to the persistent storage. A list of agents waiting on the completion of the commit process is compiled by the logger. The list of agents is provided to and provided to the next committing agent. The next committing agent then notifies the waiting agents that they are able to proceed with their respective processing. The logger may immediately perform the next update to persistent memory without utilizing a substantial amount of time notifying the waiting agents.

9 Claims, 4 Drawing Sheets

METHOD FOR IMPROVING THE PERFORMANCE OF DATABASE LOGGERS USING AGENT COORDINATION

BACKGROUND OF THE INVENTION

1. Technical Field

The present invention relates generally to computer databases and in particular to managing access to computer databases. Still more particularly, the present invention relates to a method and system for coordinating agent access to a computer database.

2. Background

Databases are useful tools for storing, organizing, and enabling access to stored data/information. Database management systems (DBMSs) are often utilized by database users to control the storage, organization, and retrieval of data (fields, records and files) in a database. Many DBMSs are implemented in a client/server environment, in which the server of the DBMS is connected to one or more client systems via a network, and the networked server coordinates client accesses to the database. Data within the databases are commonly updated and/or accessed by one or more agents associated within these remote clients connected to the DBMS.

The DBMS includes a database "logger" that records (or logs) every change that occurs within persistent storage, in order to make the database reliable. The log consists of a temporary portion and a permanent portion for efficiency of input/output. The temporary portion is used to record details of database operations such as changes to the database as they are performed. The temporary portion is known as a log buffer and resides in the memory of the DBMS. The contents of the temporary portion are periodically transferred to the permanent portion, for example when the log buffer becomes full.

Agents, on the behalf of clients, make changes to the database and record these changes in the log buffer. When an agent commits the changes, the agent process suspends until the logger writes the changes to persistent storage and notifies the agent that the changes are permanently recorded. In multiprocessing environments such as large symmetric multiprocessing (SMP) systems, a large number of clients (users) may make changes to the database contemporaneously with each other. However, to insure the reliability of the database, only a single client (using a corresponding agent process) is permitted to update the database at a time. The logger provides a control mechanism that allows the scheduling of different agents to perform updates using a system referred to as "thread wait."

With the thread wait system, when there are thousands of agents that are executing transactions within the overall system, the logger has to first write the changes to permanent storage then notify all of the thousands of agents that these agents are now able to proceed with their respective processes. The notification of this large number of agents takes a significant amount of time and accounts for a large latency in completing each commit process by the logger. The overall transaction rate by which the agent processes update the log is limited by the speed that the logger is able to write the data and then notify all the waiting agents to proceed.

Thus conventional methods include an inherent latency as the agents are all made to wait on the logger to notify every waiting agent before any one of the waiting agents is able to proceed. Measurable inefficiencies in the database logging process have been noted, and as such, the invention recognizes the need for an improved method to complete the logging process without the inherent latency of the current methods.

SUMMARY OF THE INVENTION

Disclosed is a method, computer program product and database management system for substantially reducing the latency of the database (DB) logging process by removing the agent notification requirement from the DB logger and allowing the DB logger to proceed to the next commit process without the latency of providing each waiting agent a notification that the agent continue their respective processes. When an agent commits a change to persistent storage of the database, the request is received by the logger, which performs the update to the persistent storage. A list of agents waiting on the completion of the commit process is compiled by the logger and provided to the next committing agent. Once the commit process is completed, the next committing agent then notifies the waiting agents that they are able to proceed with their respective processing. The logger is no longer responsible for performing the notification and can immediately being working on the next update to persistent memory rather than utilize a substantial amount of time notifying the waiting agents of completion of the previous commit process.

In accordance with one aspect of the present invention, there is provided a database management system (DBMS) that includes a logger utility and multiple agents associated with multiple clients that access and update persistent storage of the database. The DBMS includes a logger that completes the data commit operations to persistent (or permanent) storage on behalf of the agents. The DBMS also includes a flag that indicates when a commit process is ongoing or completed. When a first agent commits data/work to be logged to the persistent storage, one or more clients (or agents) are made to wait (i.e., stop processing within the database) until a signal is received indicating that the logger has completed the commit process.

A second, sequentially queued agent that wishes to complete a next commit process is provided the list of waiting agents to notify on behalf of the logger. When the logger completes the commit process, the second agent initiates a notification process by which the second agent notifies all the waiting agents that they may proceed with their next transaction(s). Concurrently with this notification by the second agent, the logger initiates the commit process for the second agent. When the second agent has finished the notification, the second agent waits on the logger to write (log) the data of the second agent's process to permanent storage (if not yet completed). In one implementation, the logger commits one buffer at a time and thus, while the second agent is completing the notification, the logger may be computing and processing the next buffer's worth of work, thus enabling an increase in the throughput of the logger.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, computer program product and database management system for substantially reducing the latency of the database (DB) logging process by removing the agent notification requirement from the DB logger and allowing the DB logger to proceed to the next commit process without the latency of providing each waiting agent a notification that the agent continue their respective processes. When an agent commits a change to persistent storage of the database, the request is received by the logger, which performs the update to the persistent storage. A list of agents waiting on the completion of the commit process is compiled by the logger and provided to the next committing agent. Once the commit process is completed, the next committing agent then notifies the waiting agents that they are able to proceed with their respective processing. The logger is no longer responsible for performing the notification and can immediately being working on the next update to persistent memory rather than utilize a substantial amount of time notifying the waiting agents of completion of the previous commit process.

In accordance with one aspect of the present invention, there is provided a database management system (DBMS) that includes a logger utility and multiple agents associated with multiple clients that access and update persistent storage of the database. The DBMS includes a logger that completes the data commit operations to persistent (or permanent) storage on behalf of the agents. The DBMS also includes a flag that indicates when a commit process is ongoing or completed. When a first agent commits data/work to be logged to the persistent storage, one or more clients (or agents) are made to wait (i.e., stop processing within the database) until a signal is received indicating that the logger has completed the commit process.

A second, sequentially queued agent that wishes to complete a next commit process is provided the list of waiting agents to notify on behalf of the logger. When the logger completes the commit process, the second agent initiates a notification process by which the second agent notifies all the waiting agents that they may proceed with their next transaction(s). Concurrently with this notification by the second agent, the logger initiates the commit process for the second agent. When the second agent has finished the notification, the second agent waits on the logger to write (log) the data of the second agent's process to permanent storage (if not yet completed). In one implementation, the logger commits one buffer at a time and thus, while the second agent is completing the notification, the logger may be computing and processing the next buffer's worth of work, thus enabling an increase in the throughput of the logger.

Figure 1:
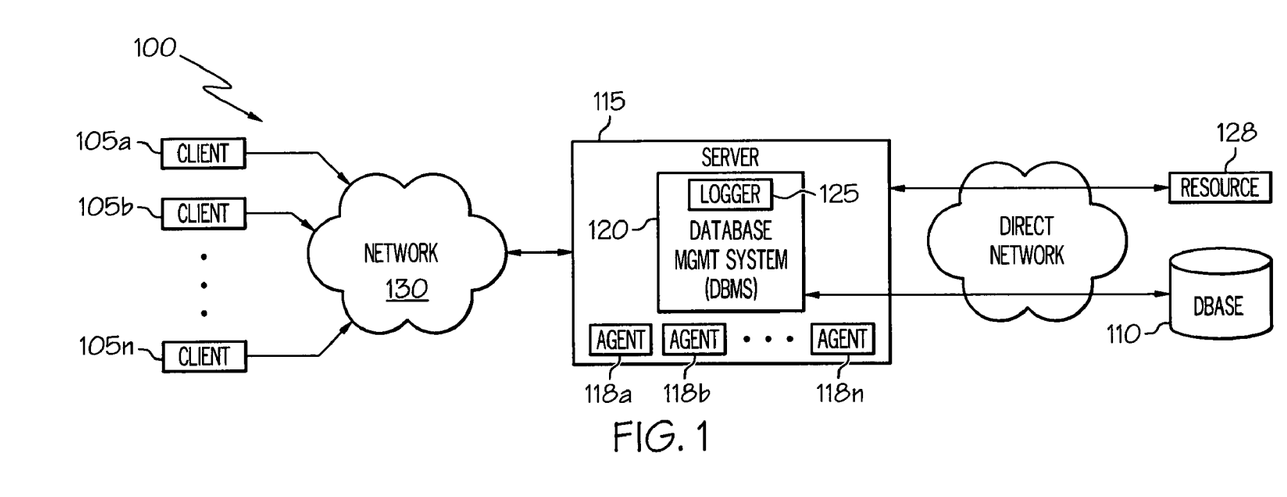
FIG. 1 is a block diagram illustrating a networked database system with remote clients coupled to a database server via a network, according to one embodiment of the invention.

Reference is now made to FIG. 1, which illustrates an exemplary networked database environment within which the features of the invention may advantageously be implemented. As shown, networked database environment 100 includes a persistent storage 110 (interchangeably referred to herein as database, disk storage medium, and/or permanent storage), having associated therewith a database (DB) server 115. Those skilled in the art will appreciate that references to database herein are references to a reliable, persistent storage device, such as a disk. Thus, for illustration, the reliable storage is described as disk storage medium, although the invention is applicable to databases with different types/form of reliable storage.

Connected via a network interface/backbone 130 to DB server 115 is a plurality of clients 105, each assumed to be communicatively coupled to database 110 and providing or responding to processes that modify the contents of database 110. As shown, clients, indicated individually by reference numerals 105*a*, 105*b*, 105*n*, each have a corresponding agent process 118*a*, 118*b*, 118*n* within a DBMS executing on the DB server 115. Clients 105 may be single processor or multiprocessor computers, workstations, handheld portable information devices, or computer networks. Clients 105 may also be the similar to each other or different from each other.

In one embodiment, the network interface/backbone 130 along with attached devices represent a wide are network (such as the Internet or World Wide Web (WWW)), while in another embodiment, network interface/backbone 130 and attached devices may represent a local area network (LAN). Further, network interface/backbone 130 may comprise a wireless link, a telephone communication, radio communication, and/or other communication mechanisms.

Networked database system 100 may also include resources 128 connected to the network 130. The resources 128 may comprise storage media, databases, a set of XML (eXtensible Markup Language) documents, a directory service such as a LDAP (Lightweight Directory Access Protocol) server, and backend systems. In some embodiments, data is stored across multiple databases. The interface between DB server 115 and database 110 and resources 128 may be a LAN, Internet, or a proprietary interface or combinations of the foregoing. The database 110 and resources 128 are accessed by DB server 115 and/or clients 124 via DB server 115. As illustrated, each one of DB server 115, clients 105, database 110 and resources 128 is located remotely from one another, although the invention is applicable to configurations in which the components are local to each other. The above described (and illustrated) configuration of the networked database system 100 and the below described DB server (FIGS. 2 and 3) are provided solely for illustration and not intended to provide any limitation on the scope of the present invention, which will be understood by those of ordinary skill in the art from a review of the following detailed description.

According to the illustrative embodiment, DB server 115 is a data processing system that executes software utilities for providing access to and control of the database 110. DB server 115 may be modeled as a distributed system having several interconnected server devices/components. DB server 115 includes database management system (DBMS) 120, which, in one embodiment may be a relational database management system, such as the DB2™, a product of International Business Machines (IBM™). Among the software utilities provided by DB server 115 and associated with the database 110 are a plurality of processes that are mostly agents 118 that act on behalf of clients 105. The actual number of processes may range from a few hundreds to thousands, and each process act on behalf of one of the multiple clients 105. One of the processes is referred to herein as the logger utility (or "logger" for short) 125, which performs several tasks, including recording/logging each transaction that occurs within the database to permanent storage within the database 110, and providing notification of when a data from an agent commit process has been stored to permanent storage.

Figure 2:
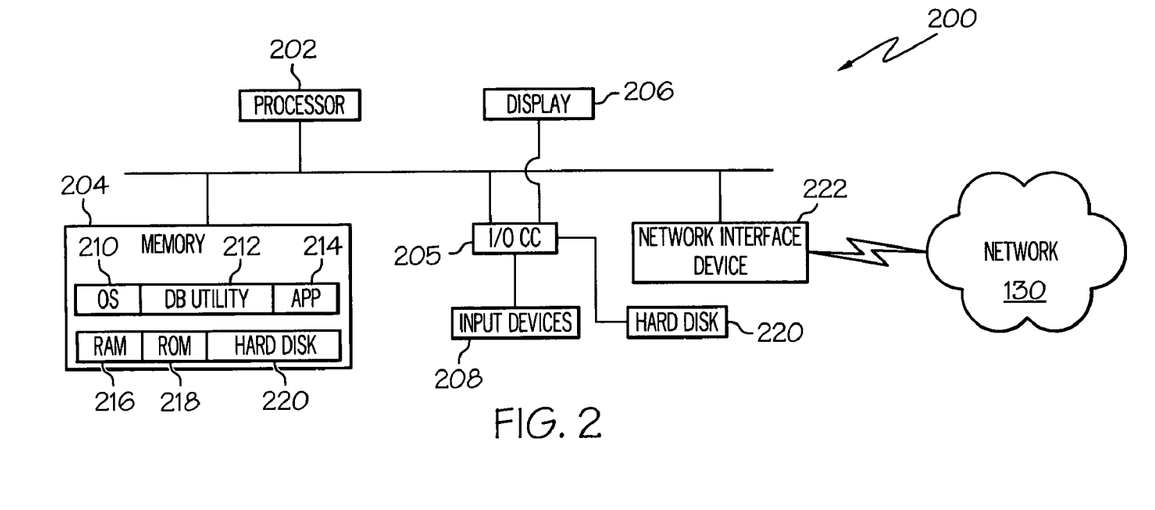
FIG. 2 is a block diagram illustrating an exemplary computer system that may be utilized as a database server, according to one embodiment of the invention.

Referring now to FIG. 2, which shows a data processing system 200, which for simplicity, is assumed to be a representative DB server 115, and is thus interchangeable describe as DB server 115. Notably, many of the basic hardware components of DB server 115 may be similar to those of a client 105, when client 105 is a data processing system. However, additional DBMS software is provided within DB server 115 that enables the functional features of an enhanced DBMS, as described herein. Thus, DB server 200 comprises a system bus 201 to which is coupled processor 202, memory 204, and input/output (I/O) controller 205. I/O controller 205 provides the controls required for several I/O devices, including display device 206, and user input devices 208, such as a keyboard and a pointing device (e.g. mouse).

DB server 200 also comprises network interface device (NID) 222, which provides an interface for communicating with network devices connected through a network via network interface/backbone 130 (e.g., clients 105 and/or database 110). DB server 200 further comprises an operating system (OS) 210, database utility (enhanced DBMS) 212, and other application programs 214, which are depicted as stored within memory 204 and which each run on (i.e., are executed by) processor 202. When executed by processor, enhanced DBMS 212 provides the various functions described herein. As depicted, memory 204 comprises random access memory ("RAM") 216 and read only memory ("ROM") 218 components. For completion of localized database functionality within DB server 200, DB server 200 also includes hard disk 220 connected via I/O CC (or a memory controller in another embodiment). Hard disk 220 may be a redundant array of independent disk (RAID) system.

Figure 3:
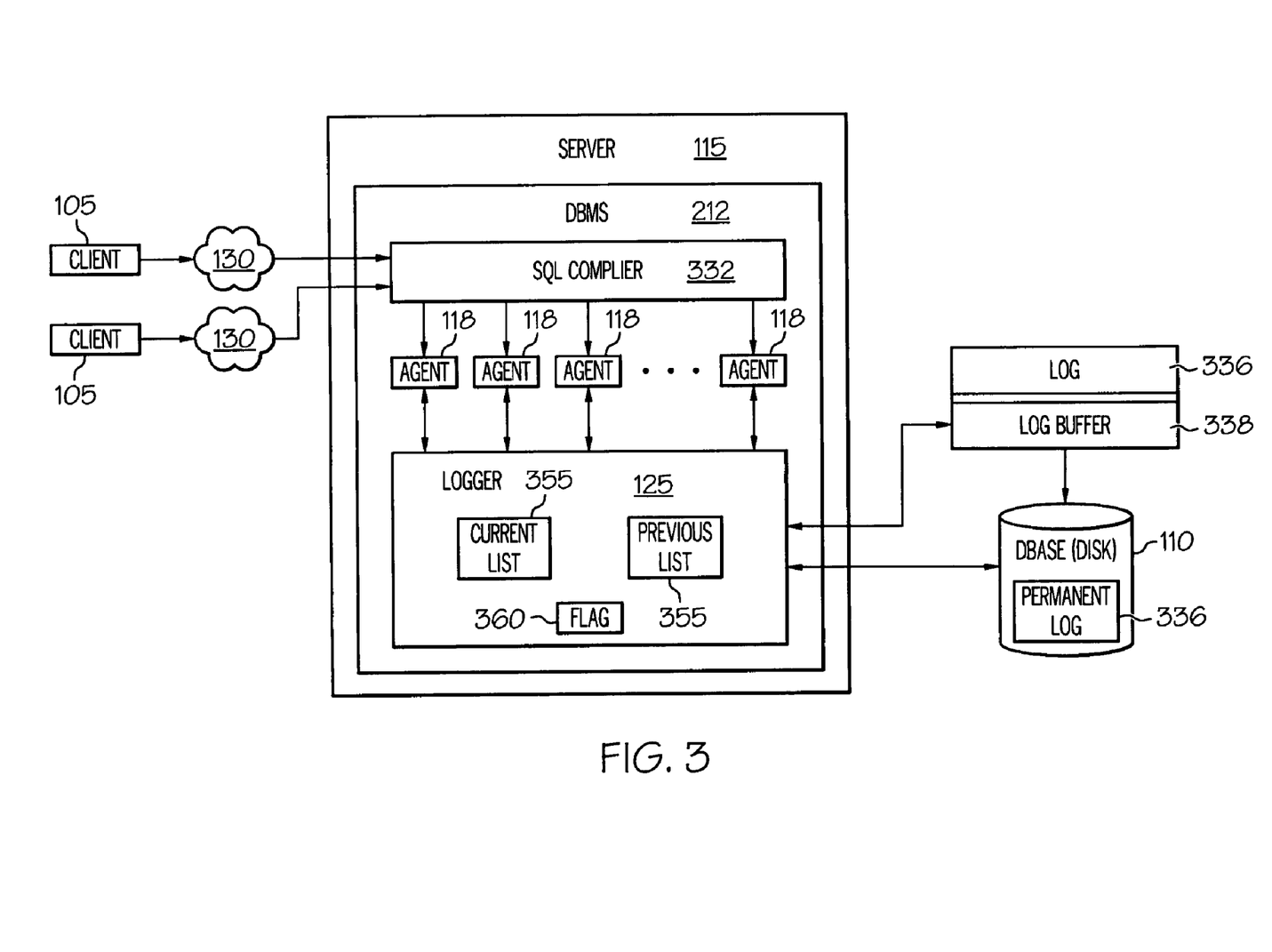
FIG. 3 is a block diagram illustrating the logger utility and other functional components of the database management system utilized within one exemplary embodiment of the invention.

Referring now to FIG. 3, which illustrates one embodiment of an enhanced database management system (DBMS) 212 designed according to the novel features described herein. Arrows indicate the directional flow of data/information between components/utilities. Enhanced DBMS 212 resides on DB server 115, which is in turn connected via the network backbone 130 to clients 105. Enhanced DBMS (or DB utility) 212 is further coupled to permanent/persistent, mass storage disk 110 (e.g., hard or fixed disk, removable or floppy disk, optical disk, magneto-optical disk, and/or flash memory) within which permanent log 336 is stored and log buffer 338 is stored. In one embodiment, the enhanced DBMS 212 is a relational database management system (RDBMS) such as the DB2™ product from IBM™.

Enhanced DBMS 212 includes an SQL compiler 332 which receives and processes clients' requests. Enhanced DBMS 212 also includes logger utility 325 which maintains and manages a log (336, 338) comprising a plurality of log records of changes made to database 310. Logger utility 125 also provides and maintains two lists, a current list 350 and a previous list 355. The functionality of these two lists is described in greater details below. Logger utility 125 also includes a completion flag 360 utilized to determine when a commit process is being undertaken and when the commit process is completed. Completion flag 360 may be a single bit register that has a first value (e.g., 1), representing the commit process is ongoing (not yet completed), and a second value (e.g., 0), representing that the commit process is completed. Notably, components illustrated and described as being "located" within or associated in some configuration relative to other components are descried as such solely for illustrative purposes. No specific orientation/configuration of the various components of enhanced DBMS 212 is required for implementation of the functionality provided by the invention.

Requests from multiple clients 105 may be received and concurrently processed by the DBMS 320. In RDBMS embodiments, database operations are requested by clients 105 in the form of SQL statements. For each change committed to database 310, the logger utility 125 creates a log record describing the change. The log record includes a temporary portion stored in a log buffer 338 and a permanent portion stored in permanent log 306 on disk 310. The log buffer 338 comprises a circular buffer of fixed or pre-determined size.

Figure 4A:
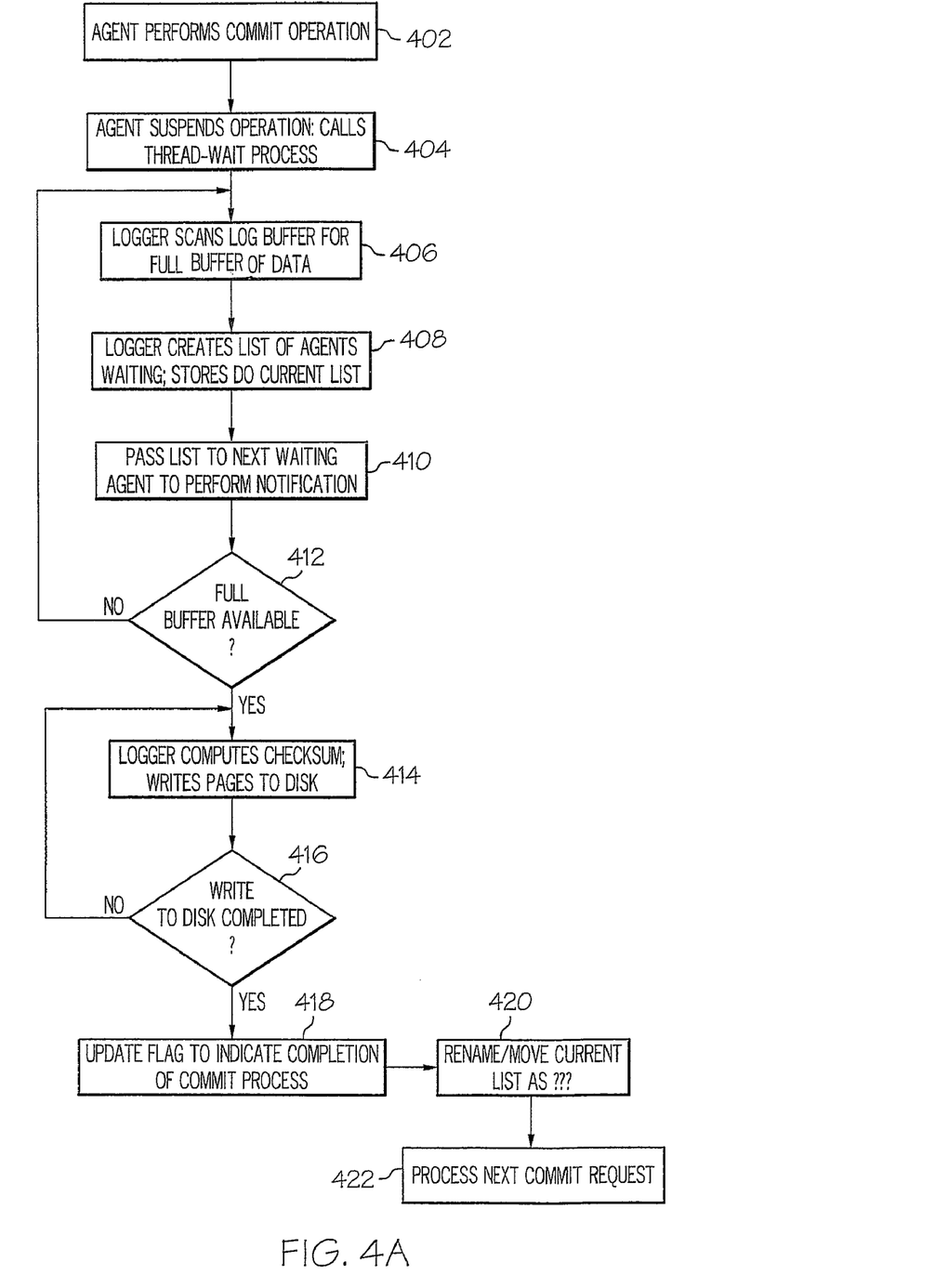
FIG. 4A is a flow chart illustrating the process of a logger completing a commit operation from an agent within an enhanced DBMS scheme according to one embodiment of the invention.
Figure 4B:
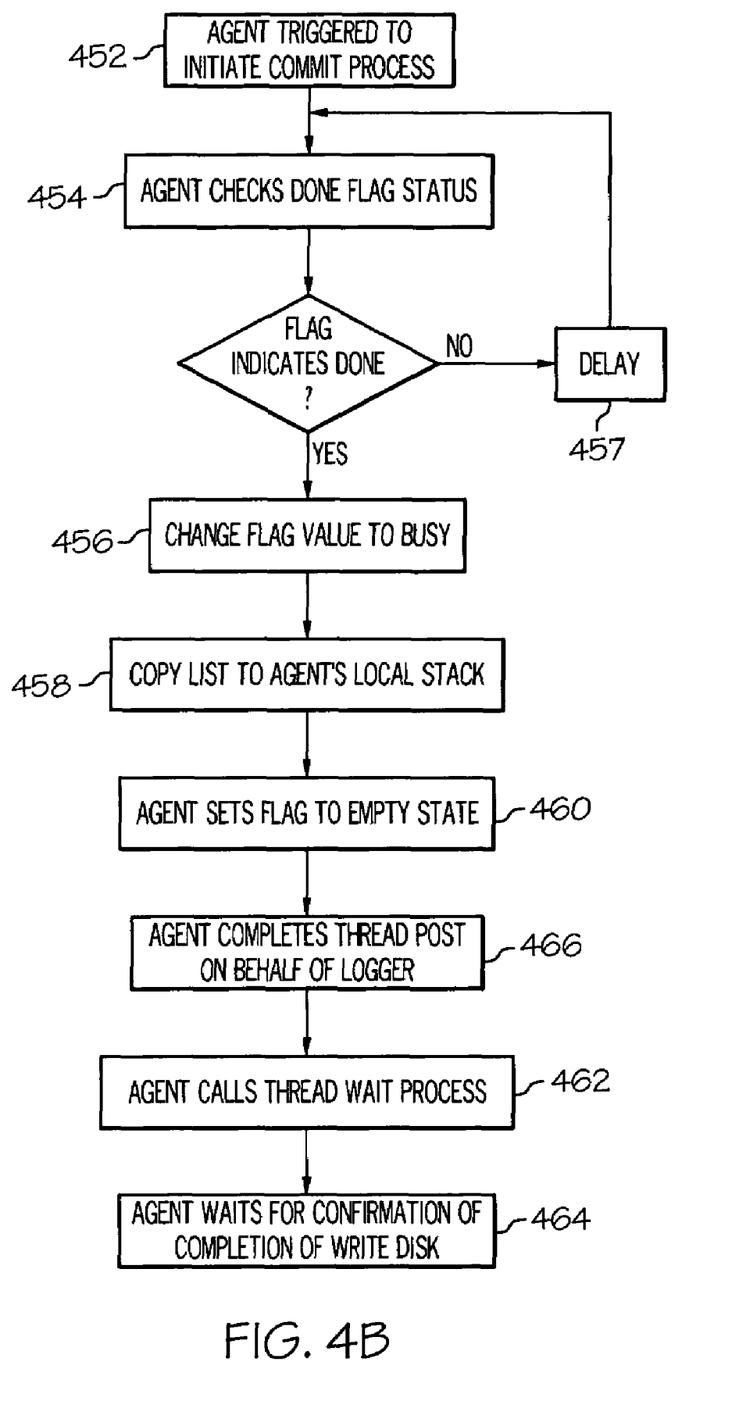
FIG. 4B is a flow chart illustrating a different process by which the logger utility coordinates with the agents to complete a more efficient data commit process according to one embodiment of the invention.

Referring now to FIGS. 4A and 4B, which are flow charts illustrating the processes carried out by the various functional blocks (depicted within FIGS. 2-3) when the logger completes data commits for agents according to the functional features of the described embodiment of the invention. As agents 118 make changes to the database 110, the changes are first recorded in log buffer 338. As shown by FIG. 4A, when an agent performs a commit (step 402), the agent suspends operation by calling a thread-wait process that forces the other agents to wait until the logger 125 has written the data to permanent storage 336 (step 404). The logger 125 continuously scans the log buffer 205 looking for a full buffer of data to write to the permanent storage 336 (step 406). The logger 125 also generates/pools a list of agents that are waiting on the buffer to be written to permanent storage and stores that list as current list 350 (step 408).

As shown in the illustrative embodiment, two (2) different lists are maintained by the logger 125, a current list 350 and a previous list 355 (i.e., a list of agents to notify of the completion of the commit process). In the illustrative embodiment, once the logger 125 completes the current list 350, the logger 125 passes the current list 350 to the next agent waiting to complete a commit process (step 410). The logger 125 next determines if there is a full buffer of data available to be written (step 412). If not, the logger continues to scan/monitor for a full buffer.

When a full buffer is identified, the logger 125 computes a checksum on the pages within the full buffer and writes the data to the disk (step 414). The logger 125 next determines when the write operation completes (step 416). After the logger 125 guarantees that the write operation is completed (i.e., the pages are on the disk 115), the logger 125 updates the completion flag to indicate to the next agent that the previous commit process is completed (step 418). The logger then renames the current list 350 as the previous list 355 (step 420) and moves on to process the next commit request received (step 422).

According to one embodiment, as depicted by FIG. 4B, the next agent that is about to call thread wait to suspend operations (step 452) automatically checks the completion flag before calling the thread wait (step 454). If the flag is set (e.g., 1 indicates that the previous commit is completed), then the agent changes the flag automatically (e.g., to 0) to indicate that a new commit process is ongoing (i.e., the logger is busy) (step 456). That agent then gains ownership of the current list and copies the list to its local stack (step 458). When the agent completes copying the list, the agent automatically sets the flag to the empty state (step 460). The agent then calls thread wait normally (step 464), waiting to continue its transaction until it receives a confirmation that the data is on permanent storage 336 (step 466). The agent loops through the list of agents that were recorded within the current list to notify the agents that the commit operation was successful. This agent-provided notification (in lieu of the logger-provided notification of conventional implementation) informs the agents that they are able to return to execute more transactions and frees the logger to perform another commit operation as soon as the previous commit operation is completed.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A computer database (DB) system, comprising:
a database (DB) server comprising an enhanced DB management system (DBMS) that controls access to a permanent storage via a logger utility, the DB server also comprising a facility for receiving one or more commit requests issued from one or more clients to update data within the permanent storage such that each of the plurality of commit requests are performed by an agent within the DB server, and the DB server further comprising a log buffer for temporary storage of data associated with the plurality of commit requests; and
a processor associated with the DB server and which executes a plurality of instructions to enable processing means for enabling completion of a storage operation to the permanent storage for data associated with each of the plurality of commit requests which is temporarily stored in the log buffer, wherein a notification of agents waiting on a current list for the completion of the storage operation is performed as a background process without the logger utility incurring a latency of performing said notification, wherein the logger utility is able to initiate a next storage of a data associated with a next commit request to the permanent storage without itself providing said notification of waiting agents, wherein said processing means comprises:
processing means for receiving from an agent on behalf of one of the clients a commit request for storage of data within the permanent storage;
processing means for generating and storing under control of the logger a current list of agents that are waiting on the completion of their respective commits to have data associated with the commits which are temporarily stored in the log buffer to be stored in the permanent data storage before the waiting agents on the current list may resume processing additional commits;
processing means for continually updating the current list of waiting agents while the log buffer becomes filled with data associated with the commits of the waiting agents;
processing means for continually scanning the log buffer, via the logger, to determine whether the log buffer is full of data and in response to a determination that the log buffer is full of data performing a checksum on the data within the log buffer and setting within the logger a logger completion tracking mechanism status to busy;
processing means for storing data which has been temporarily stored within the log buffer to the permanent storage only when the entire log buffer is full of data, wherein a completed grouping of data that does not fill the entire log buffer is not stored until the entire log buffer is full;
processing means for automatically notifying, via the next sequential waiting agent, the agents waiting on the current list that their respective commits have been completed by the logger, such that the next sequential waiting agent monitors the logger completion tracking mechanism status prior to entering a commit transaction wait state such that if the status indicates that the logger is available, which indicates that commits of the agents waiting on the current list have been completed, then the next sequential waiting agent copies the current list and sets the status to indicate that the logger is unavailable and then enters the commit transaction wait state while performing the notification of the agents on the copied current list and remains in the commit transaction wait state until it receives confirmation that data associated with its respective commit has been stored to the permanent storage; and
processing means for releasing the logger, concurrently with the automatic notification of all agents on the current list via the next sequential waiting agent, to process a next commit request without requiring that the logger notify the agents on the current list of agents that are waiting on the completion of the storage of data for their respective commits.

2. The computer DB system of claim 1, further comprising:
processing means, when the storage of data associated with commits of the agents waiting on the current list is completed, for renaming the current list of waiting agents as a previous list; and
processing means for subsequently generating a new current list for a next commit request being processed by the logger.

3. The computer DB system of claim 2, further comprising:
a first storage location in the DBMS to store the current list of agents waiting on a completion of a commit request; and
a second storage location in the DBMS to store the previous list.

4. In a computer database (DB) system, a method comprising:
controlling access to a permanent data storage of the computer DB system via a logger utility, wherein only a logger is allowed to update the permanent data storage based on commit requests received from one or more agents associated with one or more clients requesting updates to the permanent data storage, wherein the DB system includes a DB server having a DB management system (DBMS) and a log buffer for temporary storage of data;

receiving from an agent on behalf of a client a commit request for storage of a data within the permanent data storage;

generating and storing under control of the logger a current list of agents waiting on the completion of their respective commits to have data associated with the commits which are temporarily stored in the log buffer to be stored within the permanent data storage before the agents waiting on the current list may resume processing additional commits;

continually updating the current list of waiting agents while the log buffer becomes filled with data associated with the commits of the waiting agents;

continually scanning the log buffer, via the logger, to determine whether the log buffer is full of data and in response to a determination that the log buffer is full of data performing a checksum on the data within the log buffer and setting within the logger a logger completion tracking mechanism status to busy;

storing data which has been temporarily stored within the log buffer to the permanent data storage only when the entire log buffer is full of data, wherein a completed grouping of data that does not fill the entire log buffer is not stored until the entire log buffer is full;

completing, via the logger, the storage of the data to the permanent data storage, including a determination by the logger that all data from the full log buffer has been stored in the permanent data storage, including setting the logger completion tracking mechanism status to available, passing the current list to a next sequential waiting agent not on the current list;

automatically notifying, via the next sequential waiting agent, the agents waiting on the current list that their respective commits have been completed by the logger, such that the next sequential waiting agent monitors the logger completion tracking mechanism status prior to entering a commit transaction wait state such that if the status indicates that the logger is available, which indicates that commits of the agents waiting on the current list have been completed, then the next sequential waiting agent copies the current list and sets the status to indicate that the logger is unavailable and then enters the commit transaction wait state while performing the notification of the agents on the copied current list and remains in the commit transaction wait state until it receives confirmation that data associated with its respective commit has been stored to the permanent storage; and concurrently with the automatic notification of all agents on the current list via the next sequential waiting agent, the logger is released to process a next commit request without requiring that the logger notify the agents on the current list of agents that are waiting on the completion of the storage of data for their respective commits.

5. The method of claim 4, further comprising:

when the storage of data associated with commits of the agents waiting on the current list is completed, renaming the current list of waiting agents as a previous list; and subsequently generating a new current list for a next commit request being processed by the logger.

6. The method of claim 5, further comprising:

storing the current list in a first storage location of the DBMS and the previous list in a second storage location of the DBMS.

7. A computer program product for a database (DB) system, comprising:

a computer storage medium included in a DB system that includes program code that when executed by a processor of the DB system that includes a DB server implementing an enhanced DB management system (DBMS), such that the DB system includes a DB server having a DB management system (DBMS), a permanent data storage, and a log buffer for temporary storage of data, said program code enables the DB system to perform the following functions:

controlling access to the permanent data storage of the computer DB system via a logger utility, wherein only a logger is allowed to update the permanent data storage based on commit requests received from one or more agents associated with one or more clients requesting updates to the permanent data storage;

receiving from an agent on behalf of a client a commit request for storage of a data within the permanent data storage;

generating and maintaining under control of the logger a current list of agents waiting on the completion of their respective commits to have data associated with the commits which are temporarily stored in the log buffer to be stored within the permanent data storage before agents waiting on the current list may resume processing additional commits;

continually updating the current list of waiting agents while the log buffer becomes filled with data associated with the commits of the waiting agents;

continually scanning the log buffer, via the logger, to determine whether the log buffer is full of data and in response to a determination that the log buffer is full of data performing a checksum on the data within the log buffer and setting within the logger a logger completion tracking mechanism status to busy;

storing data from which has been temporarily stored within the log buffer to the permanent data storage only when the entire log buffer is full of data, wherein a completed grouping of data that does not fill the entire log buffer is not stored until the entire log buffer is full;

completing, via the logger, the storage of the data to the permanent data storage, including a determination by the logger that all data from the full log buffer has been stored in the permanent data storage, including setting the logger completion tracking mechanism status to available, passing the current list to a next sequential waiting agent not on the current list;

automatically notifying, via the next sequential waiting agent, the agents waiting on the current list that their respective commits have been completed by the logger, such that the next sequential waiting agent monitors the logger completion tracking mechanism status prior to entering a commit transaction wait state such that if the status indicates that the logger is available, which indicates that commits of the agents waiting on the current list have been completed, then the next sequential waiting agent copies the current list and sets the status to indicate that the logger is unavailable and then enters the commit transaction wait state while performing the notification of the agents on the copied current list and remains in the commit transaction wait state until it receives confirmation that data associated with its respective commit has been stored to the permanent storage; and concurrently with the automatic notification of all agents on the current list via the next sequential waiting agent, the logger is released to process a next commit request without requiring that the logger notify the agents on the current list of agents that are waiting on the completion of the storage of data for their respective commits.

8. The computer program product of claim 7, said program code further comprising code for:

when the storage of data associated with commits of the agents waiting on the current list is completed, renaming the current list of waiting agents as a previous list; and subsequently generating a new current list for a next commit request being processed by the logger.

9. The computer program product of claim 8, said program code comprising code for:

storing the current list of waiting agents in a first storage location of the DBMS and the previous list in a second storage location of the DBMS.

* * * * *

UNITED STATES PATENT AND TRADEMARK OFFICE
CERTIFICATE OF CORRECTION

PATENT NO. : 7,620,661 B2  Page 1 of 1
APPLICATION NO. : 11/260623
DATED : November 17, 2009
INVENTOR(S) : Mehaffy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 495 days.

Signed and Sealed this

Twenty-sixth Day of October, 2010

David J. Kappos
*Director of the United States Patent and Trademark Office*